United States Patent [19]

Beauseigneur et al.

[11] Patent Number: 5,334,570
[45] Date of Patent: Aug. 2, 1994

[54] PORE IMPREGNATED CATALYST DEVICE

[75] Inventors: Patricia A. Beauseigneur, Waverly; Irwin M. Lachman; Mallanagouda D. Patil, both of Corning; Srinivas H. Swaroop; Raja R. Wusirika, both of Painted Post, all of N.Y.

[73] Assignee: Corning Incorporated, Corning, N.Y.

[21] Appl. No.: 914,473

[22] Filed: Jul. 21, 1992

Related U.S. Application Data

[63] Continuation-in-part of Ser. No. 735,877, Jul. 26, 1991, abandoned, and a continuation-in-part of Ser. No. 736,417, Jul. 26, 1992, abandoned, and a continuation-in-part of Ser. No. 913,611, Jul. 20, 1992, abandoned.

[51] Int. Cl.$^5$ .............. B01J 35/10; B01J 37/02; B01J 21/04; B01J 21/06
[52] U.S. Cl. ................... 502/304; 502/261; 502/262; 502/302; 502/325; 502/339; 502/349; 502/355; 502/332; 502/333; 502/334; 502/240; 502/439
[58] Field of Search .............. 502/304, 261, 262, 302, 502/325, 339, 349, 355, 332, 333, 334, 240, 439; 423/213.5

[56] References Cited

U.S. PATENT DOCUMENTS

| | | | |
|---|---|---|---|
| 4,412,921 | 11/1983 | Leung et al. | |
| 4,451,517 | 5/1984 | Inoguchi et al. | 502/527 X |
| 4,483,940 | 11/1984 | Ono et al. | 502/523 X |
| 4,831,009 | 5/1989 | Retallick | 502/334 |
| 5,039,650 | 8/1991 | Yamada et al. | 502/304 |

OTHER PUBLICATIONS

Kainer, H. Interceram, vol. 40, No. 2, 1991, pp. 99–108.

Primary Examiner—Anthony McFarlane
Assistant Examiner—Douglas J. McGinty
Attorney, Agent, or Firm—K. van der Sterre

[57] ABSTRACT

A porous catalyst support which may be used in a catalytic converter for treating automotive exhaust gases. The support comprises a substrate having a multichannel structure of generally thin walls and washcoat particles of colloidal particle size mainly or wholly within the pores of the walls so as to increase open frontal area and reduce back pressure. Substrate is either ceramic or metal. In a ceramic substrate with microcracks in the walls, the washcoat colloidal dispersion is free of soluble inorganic constituents and the particles do not fill the microcracks so as to prevent undesirable increase in thermal expansion and corresponding decrease in thermal shock resistance.

35 Claims, 7 Drawing Sheets (PRIOR ART)
Fig. 1

PORE IMPREGNATED CATALYST DEVICE

RELATED APPLICATIONS

This is a continuation-in-part of U.S. patent application Ser. Nos. 07/735,877 and 07/736,417, both filed Jul. 26, 1991, and now both abandoned, and of U.S. patent application Ser. No. 07/913,611, filed Jul. 20, 1992, now abandoned.

BACKGROUND OF THE INVENTION

The field of the invention is catalyst devices each of which comprise a multichannel or honeycomb, porous walled, substrate containing a high surface area oxide washcoat as the support for metal catalyst dispersed on and bonded to the washcoat. Such devices with noble metal catalyst are useful for catalytically converting pollutants in the exhaust gas emitted by an internal combustion engine.

In such field it is commonly and commercially known to provide a washcoat layer on the wall surfaces of the porous walled substrate. The surface area of the washcoat is desirably greater than 50 $m^2/g$ (or more likely 100 $m^2/g$) and preferably at least 150 or 200 $m^2/g$. Such substrate is usually a porous ceramic material, such as cordierite, but it can also be a porous metal material (in contrast to nonporous metal foil). These porous materials are customarily of relatively low surface area, e.g. less than 10 or 5 $m^2/g$ (and, for some ceramic materials, less than 2 $m^2/g$), and formed by sintering plastically shaped or formed particulate materials that yield the porous ceramic or metal material of the substrate. Usually the substrate is formed by extrusion and sintering of a plasticized mixture, e.g. into a thin walled honeycomb as described in U.S. Pat. Nos. 3,790,654 and 3,824,196. However, the multichannel substrate can be formed in any other useful configuration and by any other suitable process, e.g. as described in U.S. Pat. Nos. 3,112,184. The washcoat is typically applied to the substrate by dipping the substrate in a slurry, usually in water, of oxide particles that will form the washcoat. Such slurry can also include a dissolved catalyst precursor compound, from which the precursor will adsorb and disperse on the particles, and that will decompose and yield the metal catalyst upon calcining or heat treating the washcoat to bind the latter to the substrate. Such heating also causes the metal catalyst to be dispersed and bonded on the washcoat.

Internal combustion engine performance, e.g. in an automobile, is related to the back pressure effect of the catalytic converter in the exhaust gas conduit extending from the combustion chambers of the engine. Such performance generally improves as the back pressure is decreased.

In order to decrease the back pressure and increase engine performance, the open frontal area (OFA) of the support, i.e. the aggregate open transverse cross sectional area of the flow-through channels or cells of the washcoated, multichannel or honeycomb substrate, should be increased. However, this approach until now has been hindered by problems and accommodated by less than the desired solution.

For example, such approach is limited on the one hand by the necessity of applying an adequate amount (i.e. not too thin layer) of washcoat for sufficient catalytic function of the device, and on the other hand by maintaining enough wall thickness for structural integrity of the support. A relatively great amount of high surface area oxide is necessary in order to accommodate a sufficient amount of noble metal catalyst dispersed and bonded thereon, which would not be provided by a decreased quantity of high surface area oxide layer.

A known approach to avoiding the washcoat layer taking up space in the channels or cells of the support is the manufacture of the substrate with the washcoat material mixed with the particulate material for the structural (e.g. ceramic) material so that the formed and sintered product is the catalyst support with the washcoat particles embedded in and distributed through the walls as described in U.S. Pat. Nos. 4,637,995 and 4,657,880. A catalyst may subsequently be deposited on those washcoat particles. Additionally, such washcoat particles may have metal catalyst deposited on them before being mixed with particles of the structural material and embedded in the walls as described in U.S. Pat. No. 4,888,317. In either form, the resulting catalyst device can be characterized as a catalyst-in-wall structure. To date, such a catalytic converter device has been found not to provide catalytic activities as good as catalytic converter devices with the conventional type of washcoat layer on the wall surfaces.

The washcoat materials known or accepted, prior to the new invention described herein, for suitable support of noble metal catalysts yielding desired catalytic activities generally contain substantial amounts of oxide particles having particle diameters greater than 1 $\mu m$. As a consequence of such relatively large particles, it has not been possible to cause a substantial amount of the oxide particles of the washcoat to go into the pores of the walls of the flow-through channels of the porous supports so as to leave a thinner surface layer thereof on the walls of the substrate and thereby yield greater OFA. In typical multichannel or honeycomb substrates, the total open porosity, by volume, is in the approximate range of 5–50% (or more likely 5–25% for metal substrates and 30–45% for ceramic), and the average pore size is in the approximate range of 1–50 $\mu m$ (or more likely 3–10 $\mu m$). Such pores are too small to enable adequate amounts of washcoat particles to enter them.

However, in regard to the back pressure problem, commercial efforts have been reasonably successful over the years in successively reducing the thickness of honeycomb substrate walls from about 0.3 mm to about 0.17 mm and recently to some extent to 0.1 mm. Such wall thickness reductions provide correspondingly increased OFA for substantially similar transverse cross sectional cell density in the supports. The latter efforts were made possible with new substrate material of some improved intrinsic strength to approximately offset loss of bulk strength with thickness reduction.

Some ceramic materials, e.g. cordierite and aluminum titanate plus mullite, of substrates are characterized by advantageously having microcracks in their structure. Such microcracks contribute to higher resistance to thermally induced cracking by allowing the thermally expanding material to reduce their widths, which lowers the overall (i.e. average) thermal expansion of the ceramic substrate material, and thereby avoid thermal stresses that otherwise would develop in the material. However, washcoating of such microcracked substrates can cause a serious problem. U.S. Pat. Nos. 4,451,517 and 4,532,228 reveal that washcoats fill the microcracks and obstruct their beneficial function during thermal shock conditions. Such obstruction during repeated heating and cooling of the converter causes strains and cracking induced by thermal expansion of the substrate material that is not allowed to reduce the width of the obstructed microcracks. As the solution to this obstruction problem, these patents teach the filling of the microcracks with organic materials before applying the washcoat on the wall surfaces of the substrate, so that the washcoat cannot enter the microcracks, and then burning out the organic binder while calcining or heat treating the washcoat to bind it to the wall surfaces of the substrate.

These prior art teachings indicate that it should not be usefully possible to deposit a washcoat mainly in the pores of the walls of multichannel or honeycomb substrates and support a metal catalyst on the washcoat to effect catalytic activities at least comparable to the activities of conventionally washcoated converters known prior to the invention described herein.

In washcoating porous walled substrates with the prior known slurries of the high surface area oxide particles, where a substantial portion of those particles have particle diameters larger than 1 μm, typical formulations of the slurries have desirably high solids content of spray dried boehmite or calcined gamma alumina and, consequently, are characterized by relatively high viscosity. In some cases the slurries include dissolved noble metal precursors or compounds. Such slurries behave in a conventional slip casting mode, wherein their composition and flow properties significantly change during the coating operation. Such behavior presents a problem. After dipping a number of the substrates in such slurry, a disproportionate amount of water is taken up by the substrates. The slurry remaining after washcoating a number of substrates is depleted of water such that its viscosity is too high for continued use in washcoating. It is often difficult to reclaim such depleted slurry as it is not always easy to add water to it in a manner to reconstitute the necessary uniform slurry composition with uniform viscosity.

SUMMARY OF THE INVENTION

The invention overcomes the foregoing problems by providing a catalytic device comprising a novel porous catalyst support with a multichannel, e.g. honeycomb, substrate, and by providing a novel method of making such catalyst support by washcoating such substrate. The flow-through channels or cells respectively of the multichannel or honeycomb substrate of this invention have at most a minor amount and preferably little or no washcoat particles on their surfaces so as to substantially or fully maintain the OFA of the uncoated substrate. That feature allows flow-through of exhaust gases without substantial or any additional pressure drop that would otherwise be caused by a substantial thickness of washcoat particles significantly reducing the OFA. This reduced pressure drop relative to the conventionally washcoated multichannel catalyst supports allows the catalytic converter device of this invention to be advantageously used with automotive internal combustion engines where the highest engine performance is desired and can be maintained.

In the catalyst device of the invention, the porous catalyst support comprises a multichannel or honeycomb substrate having porous walls defining the channels or cells therein. A network of open pores is distributed through the walls. The walls contain washcoat particles bonded to the them, and all of those particles are of colloidal particle size and selected from the group consisting of alumina, rare earth oxide, silica, and zirconia. Over 50% of the washcoat particles contained by the walls are deposited within the pores on the surfaces of the pores (which are internal surfaces of the walls) and substantially throughout the walls. Any other portion of the washcoat particles (i.e. if optionally present) are deposited on the external surfaces of the walls.

The present invention also accommodates microcracked ceramic material for the multichannel substrates because the invention does not produce filling of the microcracks with washcoat particles. Thus, there is no need for the burden of preliminarily filling the microcracks with organic materials in order to prevent the washcoat from being deposited therein. In this case, the invention prevents undesirable thermal expansion cracking while also reducing back pressure.

However, the substrate of the invention can also be selected from non-microcracked ceramic material and metal material.

Each selected material for the substrate has the pores mentioned above. The total open porosity and average pore size in, and the surface area of, the substrate material generally are as described above.

Furthermore, the method of this invention provides washcoating with a flowable colloidal dispersion that does not significantly change composition or flow properties during extended washcoating with it. Such colloidal dispersion remains easily flowable, of relatively low viscosity, and nonthixotropic. It is a dispersion of particles wholly of colloidal particle size as defined below. Such particles do not settle out or separate from their dispersed state unless flocculated by a suitable electrolyte. Generally proportionate amounts of both colloidal particles and liquid in the colloidal dispersion infiltrate the pores of the substrate, thereby leaving the remaining colloidal dispersion not retained on the surfaces of the walls not degraded with usage. The general concept and nature of "colloidal dispersion" are known and understood by those skilled in such technology.

The basic method of washcoating the porous sustrate described above comprises:

a) providing a flowable colloidal dispersion of oxide particles in a first evaporable liquid, wherein the particles are wholly of colloidal particle size and selected from the group consisting of alumina, rare earth oxide, silica and zirconia;

b) contacting the walls of the substrate with the colloidal dispersion to cause the colloidal dispersion to infiltrate substantially all of the open pores;

c) removing the walls of the substrate, with colloidal dispersion contained thereon, from contact with substantially the remainder of the colloidal dispersion to provide within the pores on the surfaces thereof a quantity of the contained colloidal dispersion having over 50% of the particles in the contained colloidal dispersion, and to provide on the external surfaces of the walls any other portion of the contained colloidal dispersion (i.e. if optionally present) having any minor portion of the particles in the contained colloidal dispersion;

d) drying the infiltrated substrate to cause the first liquid to evaporate out of the substrate, to cause the over 50% of the particles on the walls to deposit on surfaces of the pores, and to cause any other minor portion of the particles on the walls (i.e. if optionally present) to deposit on the external surfaces of the walls.

For bonding the particles to the walls of the substrate for durability of the support, the dried substrate is heat treated or calcined. Such bonding is both direct and indirect, i.e. one portion of the particles are directly bonded to surfaces of the substrate and the remaining portion of the particles are bonded only to other particles, at least some of which are those bonded directly to such surfaces.

A metal catalyst precursor may be added to the washcoat oxide particles by one of two methods: after or before such particles are deposited and bonded on the walls.

In the first method, the bonded particles are contacted with a solution comprising a metal catalyst precursor in an evaporable liquid to cause the precursor to adsorb and disperse, as is known in catalyst preparation, on the bonded particles. Then the substrate with adsorbed precursor is heated to evaporate the second liquid out of the substrate, and to convert the precursor to the metal catalyst bonded and dispersed on the bonded particles.

The second method provides the advantage of a "one step" application of both the bonded particles and metal catalyst, which requires only one sequence of drying and heat treating or calcining of the washcoated substrate. The heat treating or calcining hardens and strengthens the deposits of particles as well as converts the precursor(s) to the corresponding metal(s) that constitute the catalyst.

For the "one step" application, the provision of the flowable colloidal dispersion includes incorporating a soluble catalyst metal precursor in the colloidal dispersion to cause the precursor to adsorb and disperse on the particles. In that case, the heat treating step includes heating to convert the precursor to the metal catalyst bonded and dispersed on the bonded particles.

The catalyst support of this invention with metal catalyst on the bonded colloidal particles provides a form of catalyst-in-wall structure or device that has excellent catalytic activities comparable to those of catalytic converter devices with the conventional type of washcoat layer, but with greater OFA minimizing back pressure degradation of engine performance. The former is believed to result from better gas accessibility to the metal catalyst in the pores than is the case with the earlier catalyst-in-wall structure or device mentioned above.

In one particular aspect, the invention is designed for use of noble metal as the metal catalyst. Desirably for catalytic devices to be used with internal combustion engines, the noble metal is selected from the platinum metal group, i.e. ruthenium, rhodium, palladium, osmium, iridium, and platinum. Platinum, palladium, and/or rhodium are preferred.

In an especially novel variation of the invention, the catalyst support comprises a first metal catalyst (e.g. platinum and/or palladium) dispersed on and bonded to first washcoat oxide (e.g. alumina) particles, and a second, different metal catalyst (e.g. rhodium) dispersed on and bonded to second, different washcoat oxide (e.g. ceria) particles. This support is made by the special variation of the "one step" application wherein the step of providing a flowable colloidal dispersion comprises:

(i) obtaining a first flowable colloidal dispersion of first oxide particles in a first evaporable liquid,
(ii) incorporating a first soluble precursor of a first catalyst metal in the first colloidal dispersion,
(iii) obtaining a second flowable colloidal dispersion of second oxide particles in a second evaporable liquid,
(iv) incorporating a second soluble catalyst metal precursor in the second colloidal dispersion, and
(v) mixing the first and second colloidal dispersions from steps (ii) and (iv).

When applying the method of the invention to a microcracked ceramic substrate, the colloidal dispersion is desirably prepared without inclusion of soluble inorganic constituent, such as salt of an oxide-forming metal. The undesirable presence of such constituent can yield the formation during the heat treating step of particles of its corresponding oxide in the microcracks in an amount that interferes with the ability of the microcracks to provide lower thermal expansion of the catalyst support and a corresponding greater resistance to thermal cracking. For other substrates within the invention, some soluble inorganic constituent may be included so long as it does not result in the deposition of its corresponding oxide in an amount to interfere with catalytic activities of the catalyst metal in the catalyst support.

The term "colloidal particle size" as used herein means particles having a particle size in the approximate range of 0.001 to 0.2 micrometer. More advantageously for the described effects of the invention, the noted particles should have a particle size in the approximate range of 0.001 to 0.1 micrometer and preferably in the approximate range of 0.001 to 0.05 micrometer. It is also desirable that the colloidal particles have an average diameter in the approximate range of 1 to 100 nanometers.

It is particularly notable that the invention is more advantageously carried out by providing within the pores of substrate walls at least 75% or 80% (and even at least 90% or 95% for outstanding effect as noted above) of the colloidal washcoat oxide particles contained on the walls of the substrate.

DESCRIPTION OF THE PREFERRED EMBODIMENTS

Figure 1:
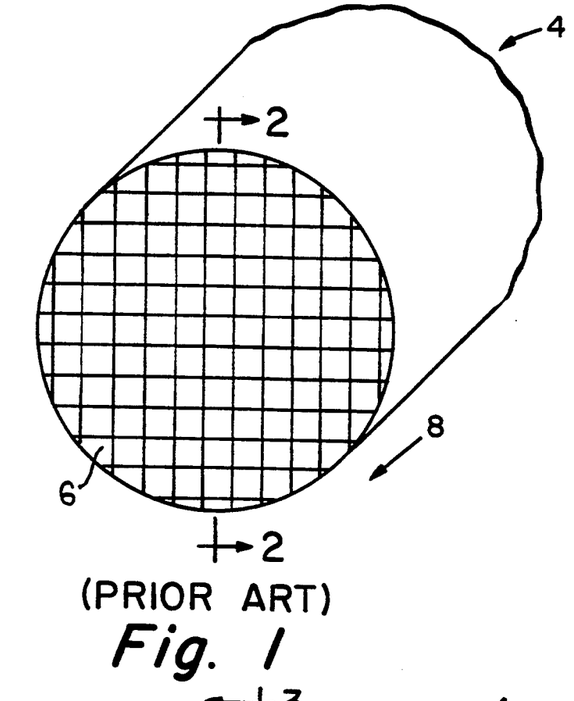
FIG. 1 is a perspective view of a typical prior art multichannel support used for catalytically converting exhaust effluent.

FIG. 1 shows a typical honeycomb support 4 that has been used in the catalytic conversion of exhaust gases from internal combustion engines. The exhaust gases are passed in the direction of arrow 8 through the open-ended channels or cells 6, where they are catalytically converted to be substantially nonpolluting.

Figure 2:
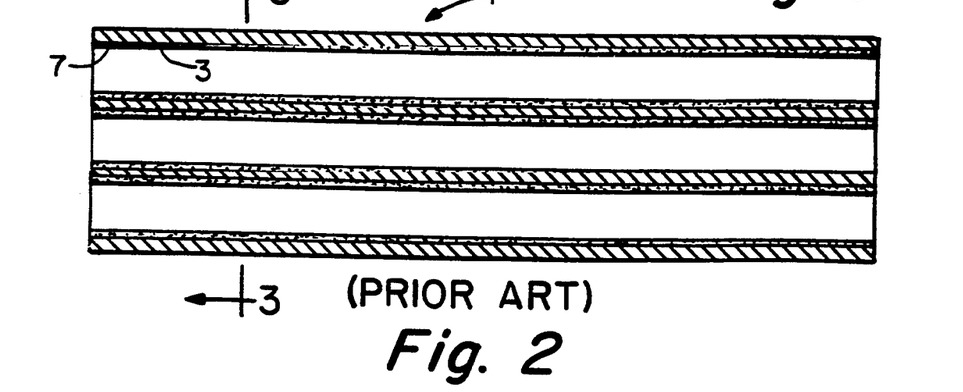
FIG. 2 is a cross-sectional view of FIG. 1, taken along lines 2—2, illustrating the channels of a substrate washcoated as typically accomplished in the prior art.
Figure 3:
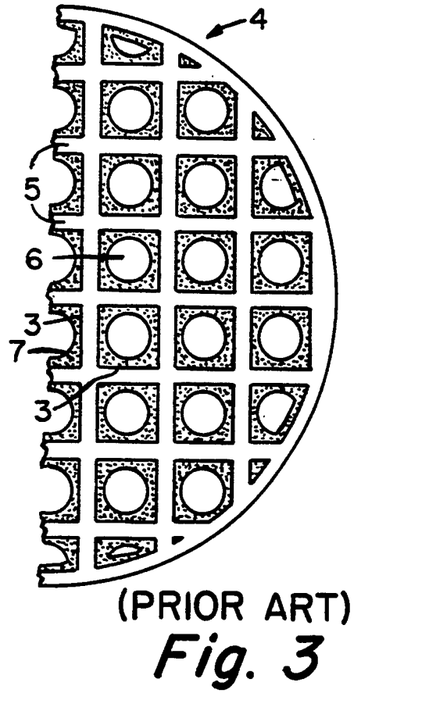
FIG. 3 is a cross-sectional view of the prior art washcoated substrate of FIG. 2, taken along lines 3—3.
Figure 4:
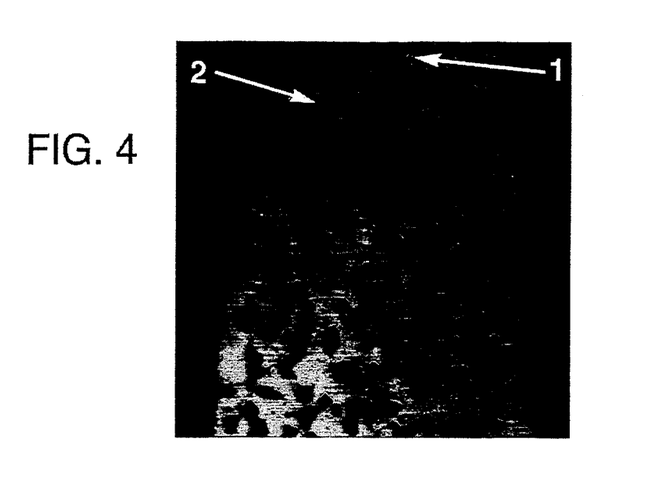
FIG. 4 is a photomicrograph showing a partial, enlarged cross section of an uncoated wall of a typical multichannel substrate like that illustrated in FIGS. 2 and 3.

As shown in FIGS. 2 and 3, the support 4 comprises a honeycomb substrate constituted by porous walls 5 of typical ceramic or metal material, which is generally extruded and sintered to form the structure shown. The walls 5 define the channels 6. As illustrated in FIG. 4, a porous wall has a network of open pores 2 distributed through the material 1 of the wall between opposite external surfaces of the wall. The external surfaces 3 of walls 5 are coated with an oxide washcoat (and catalyst) layer 7 of the conventional type in the prior art. The washcoat layer 7 is deposited, by the process of dip-coating the substrate as is well known in the art, upon the surface 3 in the form of particles suspended in a slurry, a substantial portion of which have particle sizes greater than 1 µm. The built-up thickness of layer 7 reduces the OFA of support 4 and thereby restricts gas flow through the channels 6. This restricted flow is undesirable, since it increases the back pressure in the exhaust gas stream from an engine. The rise in back pressure consequently degrades engine performance.

In FIG. 4, the material 1 is sintered metal, which does not contain microcracks. However, the structure is also representative of the network of pores in a typical sintered ceramic material, including one that contains microcracks.

Porous walled honeycomb substrates, e.g. extruded as monoliths, of metal containing aluminum can be provided with an initial thin, adherent surface coating of alumina as result of oxidation heat treatment of the substrate. High surface area washcoats of this invention can be compatibly applied to such porous substrate.

Figure 5:
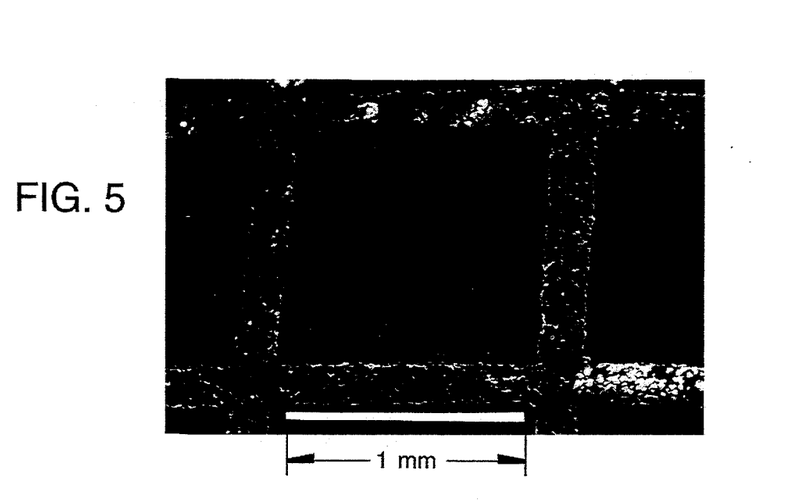
FIG. 5 is a photomicrograph showing a partial, enlarged cross section of a washcoated, substrate channel wall in accordance with this invention (with a 1 mm length reference mark).
Figure 6:
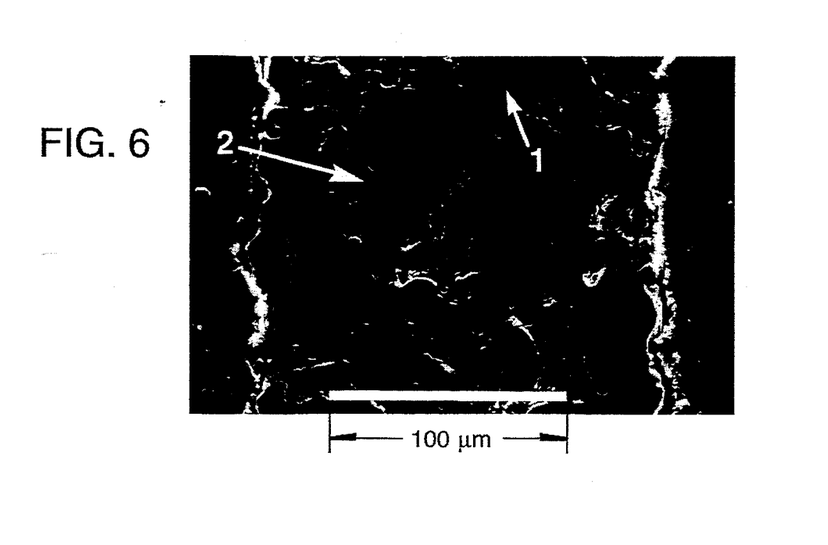
FIG. 6 is a photomicrograph showing a further enlarged view of a wall of the substrate shown in FIG. 5 (with a 100 μm length reference mark).

FIGS. 5 and 6 show the typical wall of FIG. 4 after it has been washcoated with the high surface area oxide particles of colloidal particle size according to this invention, which is typical of the washcoated walls according to the following examples. The metal material 1, the pores 2, and the deposited washcoat oxide particles are more easily seen in FIG. 6. The darker shading substantially over the area of the pores 2, relative to the lighter shading of the metal 1, is the deposit of washcoat particles. Thus, it can be seen that the washcoat particles are mostly deposited in the pores of the wall as illustrated. Very small amounts of washcoat particles are deposited on or at the external surfaces of the wall. It is estimated that over about 90–95% of the washcoat particles of FIGS. 5 and 6 are within the pores 2 on surfaces thereof.

EXAMPLE 1

A washcoat slurry for dip-coating of porous ceramic and metal monoliths of honeycomb structure was prepared according to the following example.

93 grams of finely colloidal gamma alumina (Versal-GH) obtained from La Roche Chemicals Co. were blended with 7 grams of dispersible, finely colloidal ceria obtained from the Molycorp Co. The blended alumina and ceria were slowly added while stirring to 70 ml of distilled water. After the powders were completely added, the slurry had the appearance of a gel. To this slurry was slowly added 2 ml of dilute (1:1) nitric acid to adjust the pH to 5.5. The slurry was then transferred to a Nalgene bottle (500 ml), and 200 grams of 1 cm alumina balls were added. The slurry was rolled for 18 hours. The pH of the resultant dispersion was observed to be 5.6, and was then further adjusted to 3.7 by introducing additional nitric acid. The viscosity of the dispersion was between 34 and 36 cps.

Extruded and sintered porous samples of both metal and ceramic honeycombs were washcoated by dip-coating in the dispersion, as is well known in the art. The samples were then dried in an oven at 60° C. and next fired at 550° C. for 6 hours.

The weight loading results of dip-coating the alumina and ceria on cordierite honeycombs (2.5 cm diameter×2.5 cm length) are presented in Table 1.

TABLE 1

| SAMPLE | Initial Wt. (grams) | Loaded Wt. (grams) | Wt. Gain (grams) | Washcoat Wt % | g/cc |
|---|---|---|---|---|---|
| 1 | 5.02 | 6.67 | 1.65 | 32.8 | 0.13 |
| 2 | 5.19 | 7.21 | 2.02 | 38.9 | 0.16 |
| 3 | 5.26 | 7.22 | 1.96 | 37.3 | 0.16 |
| 4 | 5.24 | 7.36 | 2.12 | 40.4 | 0.17 |
| 5 | 5.29 | 7.34 | 2.05 | 38.7 | 0.16 |
| 6 | 5.23 | 7.27 | 2.04 | 39.0 | 0.16 |

The weight loading results of dip-coating the alumina and ceria on Fe-Al honeycombs (1.7 cm diameter×1.8 cm length), prefired in air at 600° C. for 12 hours to produce a 1% wt. grain as thin adherent oxide film, are show in Table 2.

TABLE 2

| SAMPLE | Initial Wt. (grams) | Loaded Wt. (grams) | Wt. Gain (grams) | Washcoat Wt % | g/cc |
|---|---|---|---|---|---|
| 7 | 5.46 | 7.47 | 2.01 | 36.8 | 0.49 |
| | | (DOUBLE COATING) | | | |
| 8 | 5.71 | 6.56 | 0.85 | 14.9 | 0.21 |

The results of dip-coat loading of alumina and ceria on Fe-Al honeycombs (1.7 cm diameter×1.8 cm length), as sintered, are presented in Table 3.

TABLE 3

| SAMPLE | Initial Wt. (grams) | Loaded Wt. (grams) | Wt. Gain (grams) | Washcoat Wt % | g/cc |
|---|---|---|---|---|---|
| 9 | 5.40 | 6.16 | 0.76 | 14.1 | 0.18 |
| 10 | 5.19 | 6.12 | 0.93 | 17.9 | 0.23 |

The results of dip-coat loading of alumina and ceria on Fe-al honeycombs (1.7 cm diameter×1.8 cm length), prefired in air at 1000° C. for 24 hours to produce a 5.5 to 6.2% wt. gain as thin adherent oxide film, are shown in Table 4.

TABLE 4

| SAMPLE | Initial Wt. (grams) | Loaded Wt. (grams) | Wt. Gain (grams) | Washcoat Wt % | g/cc |
|---|---|---|---|---|---|
| 11 | 5.93 | 6.70 | 0.77 | 13.0 | 0.19 |
| 12 | 5.95 | 6.78 | 0.83 | 13.9 | 0.20 |
| 13 | 6.02 | 6.78 | 0.78 | 12.6 | 0.18 |
| 14 | 6.04 | 6.89 | 0.85 | 14.0 | 0.20 |

The results of dip-coat loading of alumina and ceria on Fe-Al honeycombs (1.7 cm diameter×1.8 cm length), prefired in air at 1000° C. for 24 hours to yield 2.9 to 3.1% wt. gain as thin adherent oxide film, are presented in Table 5.

TABLE 5

| SAMPLE | Initial Wt. (grams) | Loaded Wt. (grams) | Wt. Gain (grams) | Washcoat Wt % | g/cc |
|---|---|---|---|---|---|
| 15 | 5.83 | 6.52 | 0.69 | 11.8 | 0.17 |
| 16 | 5.90 | 6.73 | 0.83 | 14.0 | 0.20 |
| 17 | 6.60 | 7.49 | 0.89 | 13.5 | 0.22 |
| 18 | 5.77 | 6.53 | 0.76 | 13.2 | 0.18 |

The results of dip-coat loading of alumina and ceria on Fe-al honeycombs (1.7 cm diameter × 1.8 cm length), as sintered, are shown in Table 6.

TABLE 6

| SAMPLE | Initial Wt. (grams) | Loaded Wt. (grams) | Wt. Gain (grams) | Washcoat Wt % | g/cc |
|---|---|---|---|---|---|
| 19 | 4.90 | 5.46 | 0.56 | 11.4 | 0.14 |
| 20 | 4.92 | 5.39 | 0.57 | 11.8 | 0.14 |

From the data presented in Tables 1-6, it appears that more washcoat per unit volume is deposited into the pores of the metal honeycomb substrates than those of the ceramic honeycomb substrates.

EXAMPLE 2

Extruded and sintered, porous Fe-Al honeycombs were prepared in accordance with the method disclosed in U.S. Pat. No. 4,758,272, which method is hereby incorporated herein by reference. The prepared honeycombs were 1.8 cm in diameter × 2.3 cm in length, with a volume of 5.85 cc. The honeycombs were preoxidized at 1000° C. for 5 hours. The honeycomb samples had an average porosity of 45% with a mean pore size of 6 micrometers.

The raw materials used in the washcoat dispersion were:
(a) Colloidal alumina, Nyacol ® Al-20 (Nyacol Products, Inc.) 20 wt. % $Al_2O_3$ with normal particle size 20 nm, specific gravity 1.2, viscosity 10 cps, pH=4.
(b) Colloidal ceria, (Rhone Poulenc) 20 wt. % $CeO_2$, particle size 12 nm, specific gravity 1.2, viscosity 5 cps, pH=3.
(c) Chloroplatinic acid solution, 9.73% Pt (Engelhard).
(d) Rhodium nitrate solution, 10.2% Rh (Engelhard).

120 ml of colloidal alumina (Al-20) and 30 ml of colloidal ceria were mixed as dispersions by stirring well. Preweighed porous metal honeycombs were dipped into the colloidal slurry mixture for 1 minute, followed by clearing the excess slurry with compressed air. The samples were dried at 100° C. for 2 hours, and then fired in an electric furnace at 700° C. for 2 hours (ramp 150° C./hr).

Coating and firing steps were repeated for second, third and fourth times.

The following tables illustrate how the loading progressively increased with each loading treatment:

TABLE 7

| SAMPLE | Initial Wt. (grams) | 1st Loaded Wt. (grams) | Loading Wt. (%) | g/cc |
|---|---|---|---|---|
| 21 | 6.28 | 6.50 | 3.50 | 0.0376 |
| 22 | 6.26 | 6.45 | 3.04 | 0.0325 |
| 23 | 6.32 | 6.58 | 4.11 | 0.0444 |
| 24 | 6.32 | 6.56 | 3.80 | 0.0410 |

TABLE 8

| SAMPLE | Washcoat Loading (g/cc) after | | |
|---|---|---|---|
| | second | third | fourth |
| 21 | 0.074 | 0.109 | 0.137 |
| 22 | 0.070 | 0.104 | 0.133 |
| 23 | 0.084 | 0.120 | 0.149 |
| 24 | 0.082 | 0.115 | 0.144 |

A portion of the colloidal dispersion mixture was dried in an oven and fired at 700° C. for 2 hours. BET surface area of this material (20% $CeO_2$ and 80% $Al_2O_3$) was 138 m²/g. The samples were then loaded with platinum (25 g/ft³ or 0.0012 g/cc) and with rhodium (5 g/ft or 0.00017 g/cc) noble metals using chloroplatinic acid and rhodium nitrate solutions, respectively. After each loading, the samples were dried in an oven at 100° C. for an hour, followed by firing at 550° C. for 6 hours.

Figure 7A:
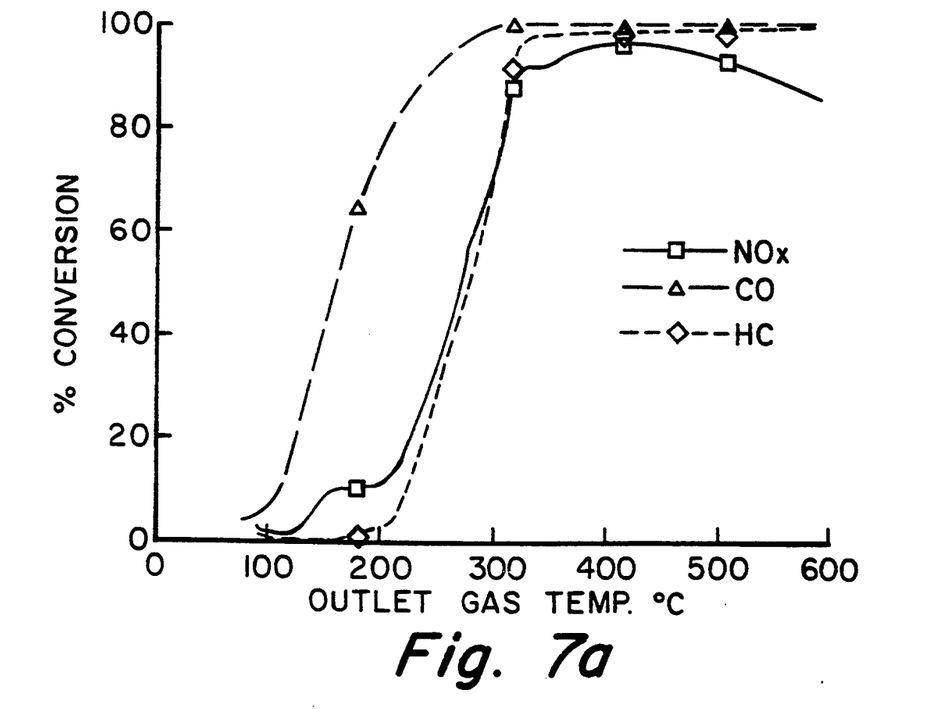
FIGS. 7a and 7b are graphs of the catalytic activities of catalyst supports of this invention having metal substrates and containing noble metal catalysts.
Figure 7B:
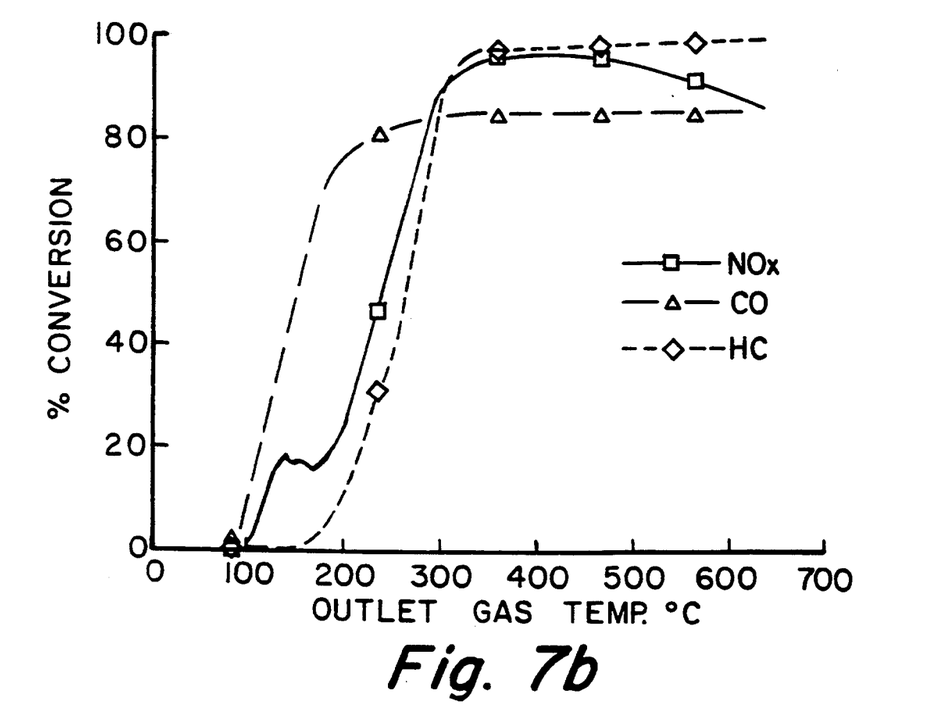

The loaded samples were next tested for automotive catalytic activity in a 1 inch (25 mm) diameter bench reactor with a simulated automotive exhaust gas mixture. The gas mixture consisted of: 500 ppm of $NO_x$, 300 ppm of propylene, 0.65% by volume CO, 0.2% by volume hydrogen, 0.46% by volume oxygen, 7.7% by volume carbon dioxide, 10% by volume water vapor, and the balance nitrogen gas. The space velocity of the gas mixture was 33,380 changes/hr. The gas conversions were measured as percent conversion compared to the inlet concentrations. The temperature of the reactor was raised to 600° C. in an hour. The catalytic conversions by Samples 23 and 24 are respectively illustrated in FIGS. 7a and 7b, as a function of temperature. These figures show that the conversions of the exhaust gases to harmless gases start at a low temperature and quickly reach a level of conversion of between 80 to 95%. The light off temperatures (at which 50% of each of carbon monoxide, hydrocarbons, and nitrogen oxides converts to nonpollutants) for Samples 23 and 24 are:

| Sample | Temperature °C. | | |
|---|---|---|---|
| | CO | HC | NOX |
| 23 | 150 | 280 | 230 |
| 24 | 160 | 285 | 280 |

These light off temperatures are as good as commercial automotive catalysts with the conventional washcoat.

Putting the washcoat and catalyst into the pores of the substrate not only locks in the catalyst, preventing the attrition of the metal (such as noble metal) over the lifetime of the converter, but it also reduces the wall thickness of the support, resulting in low back pressure and improved engine performance.

EXAMPLE 3

Extruded and sintered, porous, Fe-Al monolith honeycombs were prepared in accordance with the method disclosed in U.S. Pat. No. 4,758,272. The prepared honeycombs had 6.6 to 7.15 cm diameter × 7.6 to 8.25 cm length. The honeycombs were preoxidized at 1000° C. for 5 hours.

560 ml of colloidal alumina (Al-20) and 240 ml of colloidal ceria were mixed as a dispersion by stirring well. Preweighed porous metal honeycombs were dipped into the colloidal dispersion mixture for one minute, followed by clearing the excess slurry with compressed air. The samples were dried at 100° C. for 2 hours, and then fired in an electric furnace at 700° C. for 2 hours (ramp 150° C./hr).

Coating and firing steps were repeated for second, third, fourth and fifth times.

The following tables illustrate how the loading progressively increased with each loading treatment:

TABLE 9

| SAMPLE | Initial Wt. (grams) | 1st Loaded Wt. (grams) | Loading Wt. (%) | g/cc |
|---|---|---|---|---|
| 25 (308.0 cc) | 166.44 | 172.82 | 3.83 | 0.021 |
| 26 (339.2 cc) | 192.06 | 199.61 | 3.93 | 0.022 |
| 27 (314.3 cc) | 265.91 | 275.81 | 3.72 | 0.031 |
| 28 (307.9 cc) | 251.81 | 261.55 | 3.87 | 0.031 |

TABLE 10

| SAMPLE | Washcoat Loading (g/cc) after | | | |
|---|---|---|---|---|
| | second | third | fourth | fifth |
| 25 | 0.039 | 0.052 | 0.064 | 0.077 |
| 26 | 0.044 | 0.062 | 0.075 | 0.091 |
| 27 | 0.064 | 0.095 | 0.117 | 0.137 |
| 28 | 0.064 | 0.093 | 0.116 | 0.135 |

EXAMPLE 4

High porosity cordierite honeycomb substrates (Celcor ® EX-47, Corning, Inc.) were prepared. The prepared honeycombs had 3 inches (7.62 cm) diameter × 3 inches (7.62 cm) length (353.8 cc), 300 cells/in$^2$ or 46 cells/cm$^2$, a 0.008 inch wall thickness, and about 66% OFA.

A dispersion mixture was prepared with 350 ml of colloidal alumina (Al-20) and 150 ml of colloidal ceria which were mixed with stirring well. Preweighted honeycombs were dipped into the colloidal dispersion mixture for 1 minute, followed by clearing the excess slurry with compressed air. The samples were dried at 100° C. for 2 hours, and then fired in an electric furnace at 700° C. for 2 hours (ramp 150° C./hr).

Coating and firing steps were repeated for second, and third times.

A portion of the coating slurry was dried in an oven and fired at 700° C./2 hrs. BET surface area of this material (30% CeO$_2$ and 70% Al$_2$O$_3$) was 137 m$^2$/g. Aged (970° C./4 hrs in 1% oxygen, 8% carbon dioxide, 10% water vapor, and the balance nitrogen) material has a lower surface area, 63.7 m$^2$/g.

The following tables illustrate how the loading progressively increased with each loading treatment:

TABLE 11

| SAMPLE | Initial Wt. (grams) | 1st Loaded Wt. (grams) | Loading Wt. (%) | g/cc |
|---|---|---|---|---|
| 29 | 161.3 | 176.17 | 9.22 | 0.042 |
| 30 | 164.9 | 179.55 | 8.88 | 0.041 |
| 31 | 163.7 | 179.26 | 9.51 | 0.044 |

TABLE 12

| SAMPLE | Washcoat Loading after | | | |
|---|---|---|---|---|
| | second | | third | |
| | wt. % | g/cc | wt. % | g/cc |
| 29 | 20.01 | 0.091 | 27.75 | 0.127 |
| 30 | 17.56 | 0.082 | 24.37 | 0.114 |
| 31 | 18.31 | 0.085 | 25.58 | 0.118 |

Small samples were prepared (2.5 cm diameter × 2.5 cm length) and core drilled from the larger aforementioned samples. These smaller samples were loaded with platinum (25 g/ft$^3$ or 0.00085 g/cc) and with rhodium (5 g/ft$^3$ or 0.00017 g/cc) using chloroplatinic acid and rhodium nitrate solutions, respectively. After each loading, samples were dried in an oven at 100° C. for an hour, followed by firing at 550° C. for 6 hours.

The noble metal loaded samples were tested for automotive catalytic activity in a 1 inch (25 mm) diameter bench test reactor with the simulated automotive gas mixture utilized in Example 2. Results comparable to commercial converters was obtained.

EXAMPLE 5

A porous cordierite honeycomb substrate (Celcor ® Code 9475/EX-20, Corning, Inc.) was prepared with 400 cells/in$^2$ or 62 cells/cm$^2$, a 0.006 inch (0.15 mm) wall thickness, and about 71% OFA. A 5 cm$^2$ by 13.75 cm length sample was cut from the substrate.

A slurry was prepared with 350 ml of colloidal alumina (Al-20) and 150 ml of colloidal ceria which were mixed by stirring well. The cut sample was preweighed and then dipped into the colloidal slurry mixture for 1 minute, followed by clearing the excess slurry with compressed air. The samples were dried at 100° C. for 2 hours, and then fired in an electric furnace (ramp 150° C./hr, 700° C./2 hrs).

Coating and firing steps were repeated for second, third, fourth and fifth times.

The following tables illustrate how the loading progressively increased with each loading treatment:

TABLE 13

| SAMPLE | Initial Wt. (grams) | 1st Loaded Wt. (grams) | Loading Wt. (%) |
|---|---|---|---|
| 32 | 64.17 | 67.38 | 5.0 |

TABLE 14

| SAMPLE | Washcoat Loading (wt. %) after | | | |
|---|---|---|---|---|
| | second | third | fourth | fifth |
| 32 | 9.47 | 13.20 | 16.02 | 18.89 |

A sample (0.5 inch square by 3 inch length or 1.27 × 1.27 × 7.62 cm) was cut from the coated sample shown above, and a thermal expansion measurement was conducted. Two similar samples were also cut from the uncoated cordierite piece. One was left uncoated, and the other conventionally washcoated. Both were measured for thermal expansion as a comparison.

Figure 8:
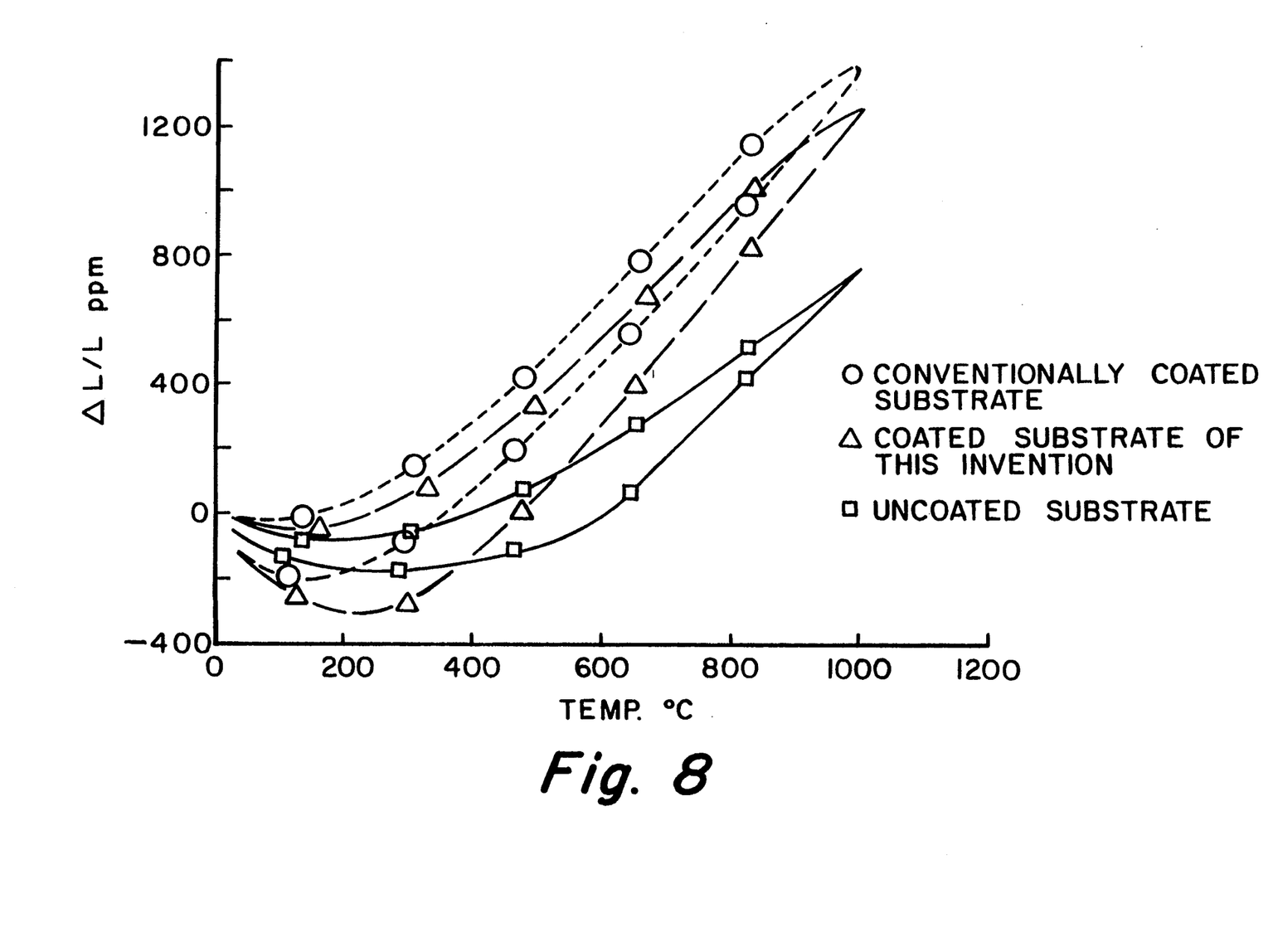
FIG. 8 is a graph of the comparative thermal expansions and contractions of a conventionally coated ceramic substrate, a coated ceramic substrate of the invention, and an uncoated ceramic substrate.

FIG. 8 illustrates the thermal expansion measurements of Sample 32, an uncoated Celcor substrate, and a conventionally washcoated Celcor substrate, the latter two being of the same porous cordierite as Sample 32. The conventionally coated sample is observed to possess a substantially larger thermal expansion than the uncoated sample. However, Sample 32 had a thermal expansion considerably less than the conventionally coated sample. This indicates that the invention provides substrates with a greater resistance to thermal shock than conventionally washcoated cordierite samples, and is indicative of the fact that the colloidal particle size washcoat particles according to this invention have been impregnated into the pores, but do not fill or enter the microcracks to the degree as do the conventional washcoat particles. All of the above samples of Examples 1 through 5 above were also examined with the SEM and found to have the coating substantially in the wall of the substrate, as shown in FIGS. 5 and 6.

EXAMPLE 6

An additional raw material for this example is colloidal $ZrO_2$ (Nyacol Products, Inc.) 20 wt. % $ZrO_2$ with normal particle size 5-10 nm, specific gravity 1.26, and viscosity 10 cps, pH=3.5.

High porosity cordierite honeycomb substrates (Celcor ® EX-47, Corning Inc.) 1 inch (2.54 cm) diameter by 1 inch (2.54 cm) length, 300 cells/square inch or 46 cells/cm$^2$, with 0.008 inch (0.2 mm) wall thickness were fabricated and treated as follows:

A coating slurry was made with 70 ml. of colloidal alumina (Nyacol ®, AL-20), 25 ml of colloidal ceria (Rhone Poulenc) and 5 ml of colloidal zirconia (Nyacol Products, Inc.). Preweighed porous ceramic honeycomb substrates were dipped into the coating slurry for 1 minute, followed by clearing the excess slurry from the substrates with compressed air. The coated samples were dried in an oven at 100° C. for 2 hours followed by firing in an electric furnace at 700° C. (ramp 120° C./hr) for 2 hours. Coating and firing steps were repeated again for second, and third times.

The following tables show how the loading progressively increased with each coating treatment:

TABLE 15

| Sample No. | Initial Wt (g) | 1st Loading (g) | Loading wt. % |
|---|---|---|---|
| 33 | 5.22 | 5.69 | 9.0 |
| 34 | 5.18 | 5.67 | 9.46 |
| 35 | 5.22 | 5.69 | 9.0 |

TABLE 16

| Sample No. | 2nd Loading Wt. % | 3rd Loading Wt. % |
|---|---|---|
| 33 | 17.43 | 24.3 |
| 34 | 17.95 | 25.7 |
| 5 | 17.82 | 25.5 |

EXAMPLE 7

Separate aqueous colloidal dispersions of alumina and ceria were prepared with solids contents of approximately 20%. Then 0.833 wt. % Pt was added to the alumina dispersion, and 0.167 wt. % Rh was added to the ceria dispersion. All of the percentages of noble metals were based on 20% total solid content in the colloidal dispersions. The platinum was added in the form of $H_2PtCl_6.6H_2O$, and the rhodium was added in the form of $Rh(NO_3)_3.2H_2O$.

After stirring the two dispersions together for five minutes with a magnetic bar and plate, Fe-Al monoliths, as previously described, were immersed into the dispersion, were allowed to remain for one minute, then removed from the slurry, allowed to drain, and then cleared with a compressed air blast through their cells.

Drying was done in a convection oven at 100° C. for two to three hours before firing at 700° C. for two hours (ramp 150° $_{C/hr}$).

The process was repeated until approximately 0.12 g/cc weight loadings were achieved on the catalyst device, which exhibited good catalytic activity.

EXAMPLE 8

15 g of colloidal ceria (obtained from Rhone-Poulenc as 20 wt. % ceria dispersion having a viscosity of 10 cps) was mixed with 35 g of colloidal alumina (AL-20 obtained from Nycol Products as 20 wt. % alumina dispersion having a viscosity of 10 cps). The mixture was stirred for one hour. 0.199 g of rhodium nitrate solution having 10 wt. % rhodium and 0.825 g of chloroplatinic acid solution having 10 wt. % of platinum was added to the colloidal dispersion. This mixture was stirred for 2 hours.

Porous Fe-Al monoliths (17 mm diameter by 17 mm length) were dip-coated with the above slurry for one minute. The channels were cleared with compressed air. The samples were dried in an oven at 100° C. for 2 hours, and then sintered at 700° C. for 2 hours.

The coating and sintering process was repeated until the sample was loaded with 20 g of noble metal per cubic foot (Pt:Rh=5:1).

The catalytic activity of the coated substrate of this example was found to compare equally with Example 8.

The following reagents were additionally used in further experiments for this invention: Ammonium tetrachloroplatinum (II), Engelhard (51.1% Pt) Dihydrogen hexahydroxyplatinum (IV), Engelhard (65.0% Pt) Tetrammine platinum (II) dichloride, Engelhard (55.4% Pt) Ammonium hexachlororhodium (III), Engelhard (27.8% Rh) Ammonium tetrachloropalladium (II), Engelhard.

The dispersions of this invention must have a working life that allows for repeated loadings, and should not cause a breakdown of the substrate when applied thereto. Experiments were conducted with various noble compounds which would provide the aforementioned objectives. Other objectives included:

(a) Water solubility: The composition should provide at least $2.08 \times 10^{-3}$ grams of Pt metal or $4.17 \times 10^{-4}$ grams of Rh per gram of colloidal mixture at a pH of 3.

(b) Substantially stable Ph: The composition must maintain a pH in the approximate range of from 3 to 4, so that the solution will not become too viscous.

(c) Negatively charged noble metal ion: The noble metals had to be adsorbed upon the protenated alumina or ceria surface to provide highly dispersed catalytic particles.

The following examples were tests conducted with several platinum compounds.

EXAMPLE 9

0.32 grams of ammonium tetrachloroplatinum (II) was added to 100 grams of an alumina/ceria colloidal mixture and stirred until completely dissolved. This took approximately 1.5 hours. No pH change was observed over this time period.

EXAMPLE 10

0.25 grams of dihydrogen hexahydroxyplatinum (IV) was added to 100 grams of the above slurry of Example 9. After stirring for one hour, approximately 25% of the solid was still visible. A pH change was observed from 3.0 to 2.9.

EXAMPLE 11

0.30 grams of tetrammine platinum (II) dichloride was added to 100 grams of the slurry of Example 9, and dissolved within 5 minutes with stirring. A pH change from 3.0 to 3.19 was observed after one hour, and rose to 3.4 after 20 hours.

The platinum compound of Example 9 was chosen as the best source of platinum of the three compounds for coated catalyst-in-wall loadings according to this invention.

Example 12

0.601 grams of ammonium hexachlororhodium (III) was dissolved in 50 grams of a colloidal ceria dispersion. Continuous stirring for 3.5 hours was required to dissolve the compound completely. No pH changes were observed over this time span. The dispersion was quite stable alone, but when added into the alumina dispersion (Al-20), it was caused to gel after 20 hours.

It was therefore decided that the platinum compound would be separately added to an alumina dispersion, the rhodium salt would be separately added to a ceria dispersion, and the two dispersions would be mixed just prior to performing the substrate coating process.

A coating of the preferred compounds was prepared using a 6:1 ratio of platinum to rhodium, and was applied to a metal monolith as aforementioned. Weight loadings of approximately 20 g/ft$^3$ of noble metals were achieved with three passes on porous metal monoliths using chloroplatinic acid/rhodium nitrate coatings.

21 g/ft$^3$ of noble metals on Celcor ® EX-20 honeycombs and 22 g/ft$^3$ on porous Fe-Al monoliths utilizing three coating passes were also obtained with similar results.

BET surface area for this coating was determined to be 124 m$^2$/g with fired substrates only, and 66.2 m$^2$/g for fired and subsequently aged coatings. This is approximately 25% greater than conventionally coated ceramic substrates.

From the above experiments, it has been found that a superior coating process has been developed that provides catalyst application in a single step.

Example 13

Extruded and sintered, porous Fe-Al honeycombs were prepared according to U.S. Pat. No. 4,758,272. The honeycombs had 1.8 cm diameter, 2.3 cm length, and 5.85 cc volume. They were preoxidized at 1000° C. for 5 hours. These honeycombs had an average porosity of 45% with mean pore size of 6 μm.

0.297 grams of ammonium tetrachloroplatinum (II) was added to 70 grams of colloidal alumina (Al-20). This dispersion was stirred for 2 hours. 0.0433 grams of ammonium hexachlororhodium (III) was added to 30 grams of colloidal ceria (Rhone Poulenc) and stirred for 2 hours. These two dispersions were combined and stirred to form a mixed dispersion.

The honeycombs were weighed and then dipped into this mixed colloidal dispersion for one minute. The excess slurry was cleared from the honeycombs with compressed air. These samples were dried at 100° C. for 2 hours, and then fired in an electric furnace at 700° C. for 2 hours (ramp 150° C./hr). This coating procedure was repeated two more times.

Tables 18 and 19 set forth the incremental loading upon the honeycomb:

TABLE 18

| SAMPLE | Initial Wt. (grams) | Loaded Wt. (grams) | Loading Wt. (%) | g/cc |
|---|---|---|---|---|
| 36 | 9.51 | 9.83 | 3.36 | 0.0376 |
| 37 | 6.42 | 6.62 | 3.12 | 0.0325 |

TABLE 19

| SAMPLE | Washcoat Loading (wt. %) after | |
|---|---|---|
| | second | third |
| 36 | not measured | 10.30 |
| 37 | not measured | 8.41 |

A portion of the colloidal dispersion was dried in an oven and fired at 700° C. for 2 hours. The BET surface area of this material (30% CeO$_2$ and 70% Al$_2$O$_3$) was 124 m$^2$/g. Aged material (970° C./4 hrs in 1% oxygen, 8% CO$_2$, 10% water vapor, balance nitrogen) has a lower surface area of 66.2 m$^2$/g.

Figure 11A:
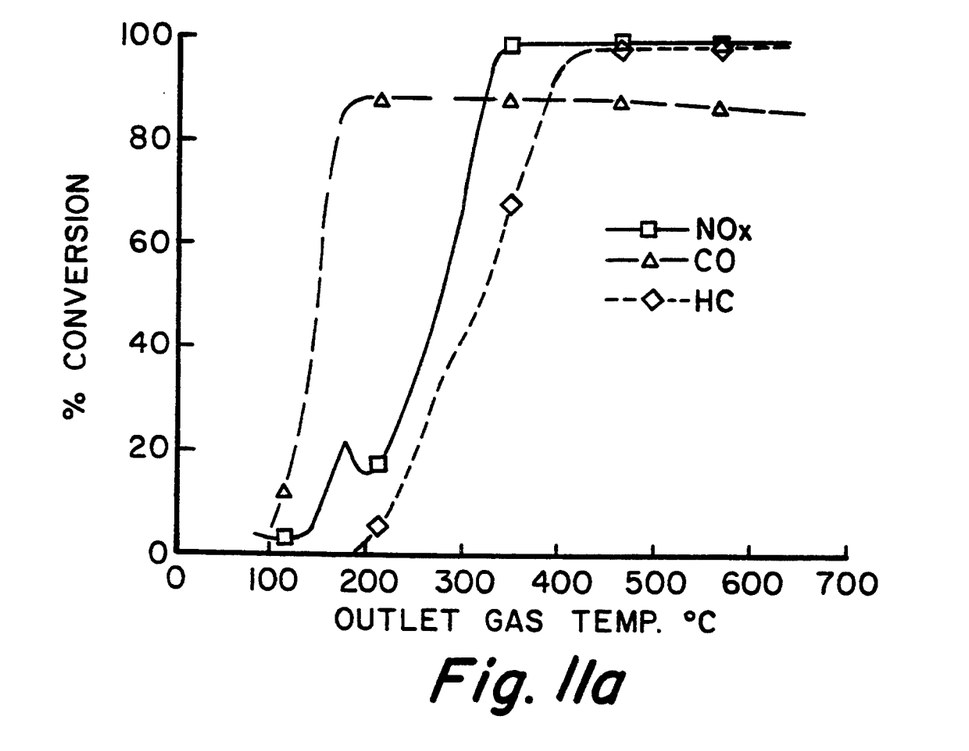
FIGS. 11a and 11b are graphs of the catalytic activities of catalyst supports of this invention having metal substrates and containing noble metal catalysts.

These samples were tested for automotive catalytic activity by the procedure in Example 2. FIG. 11a shows the conversion results on Sample 37 for CO, HC, and NOx as a function of temperature. Conversion to harmless gases starts at a low temperature and quickly reaches a conversion percentage of 80 to 95%

Example 14

High porosity cordierite honeycombs (Celcor ® EX-47, Corning, Inc.) had a 1 inch (2.54 cm) diameter, 1 inch (2.54 cm) length, 300 cells/in$^2$ (46 cells/cm$^2$), and 0.008 inch (0.2 mm) wall thickness.

0.247 grams of ammonium tetrachloroplatinum (II) was added to 52.5 grams of colloidal alumina (Nyacol ® Al-20). This dispersion was stirred for 2 hours. 0.0908 grams of ammonium hexachlororhodium (III) was added to 22.5 grams of colloidal ceria (Rhone Poulenc) and stirred for 2 hours. These two dispersions were combined and stirred to form a mixed colloidal dispersion.

The honeycombs were dip-coated as in Example 13. Then that coating procedure was repeated for a second and third time. Tales 20 and 21 show the progression of loading upon the honeycomb with each subsequent coating and firing step:

TABLE 20

| SAMPLE | Initial Wt. (grams) | 1st Loaded Wt. (grams) | Loading Wt. (%) |
|---|---|---|---|
| 38 | 5.23 | 5.71 | 9.18 |
| 39 | 5.16 | 5.64 | |
| 40 | 5.04 | 5.47 | 8.53 |
| 41 | 5.05 | 5.56 | 10.1 |
| 42 | 5.19 | 5.70 | 9.83 |

TABLE 21

| SAMPLE | Washcoat Loading (wt %) after | |
|---|---|---|
| | second | third |
| 38 | 17.6 | 27.5 |
| 39 | 18.02 | 28.1 |
| 40 | 16.07 | 26.0 |
| 41 | 18.42 | 27.7 |
| 42 | 18.69 | 27.6 |

The platinum and rhodium contents were analyzed for Sample 41, and the analytical results are: 0.155 wt % Pt 0.031 wt % Rh 22.0 g/cc Pt 4.4 g/cc Rh. Generally it is desired to have the weight ratio Pt:Rh in the range of 5-30.

Figure 11B:
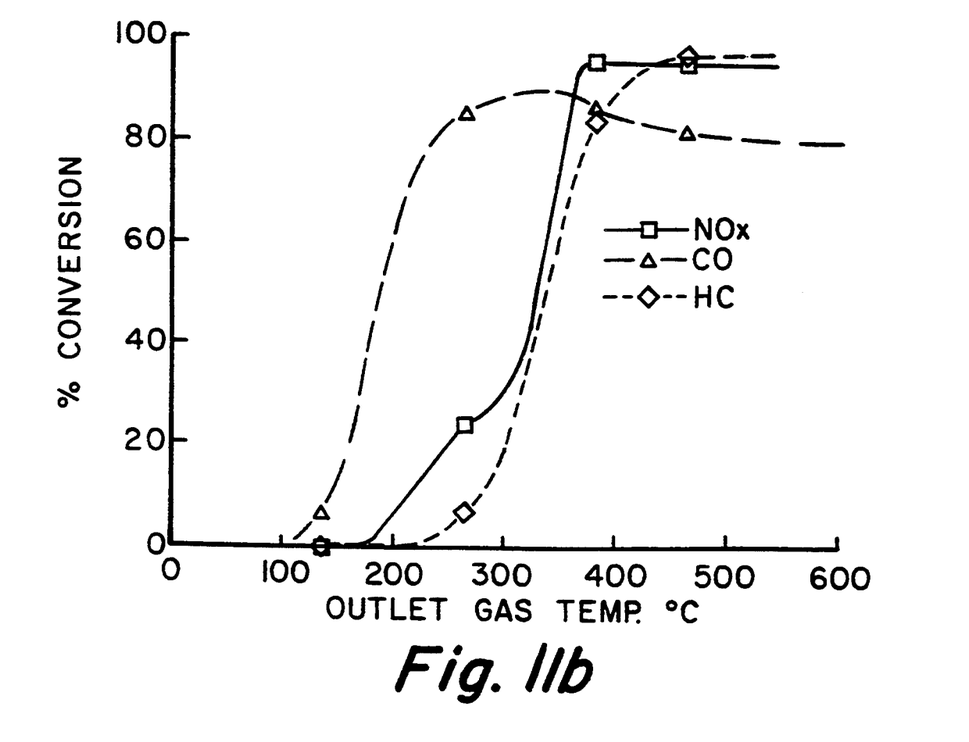

The samples were tested for automotive catalytic activity by the procedure in Example 2. FIG. 11b shows the results of the testing. Conversion of CO, HC, and NOx as a function of temperature starts at low temperature and quickly reaches conversion percentages of 80 to 95%.

Example 15

Using the coating procedure of Example 13, separate EX-47 cordierite honeycomb samples 1 inch (2.54 cm) diameter and 3 inches (76.2 cm) length were washcoated with: (a) a dispersion of Al-20 alumina mixed with Rhone Poulenc (RP) colloidal ceria, (b) a mixed dispersion of Al-20, RP ceria, and cerium acetate (13% dissolved cerium acetate from Rhone Poulenc), and (c) the Rhone Poulenc cerium acetate. Table 22 sets forth the washcoat data (average of 2 samples):

TABLE 22

| SAMPLE | Loading wt. % | Coats Number | Ce Acetate wt. % | Al-20 wt. % | $CeO_2$ wt. % |
|---|---|---|---|---|---|
| 43 | 33.5 | 4 | 1.3 | 69.1 | 29.6 |
| 44 | 33.9 | 4 | — | 70.0 | 30.0 |
| 45 | 11.0 | 4 | 100 | — | — |

Figure 9:
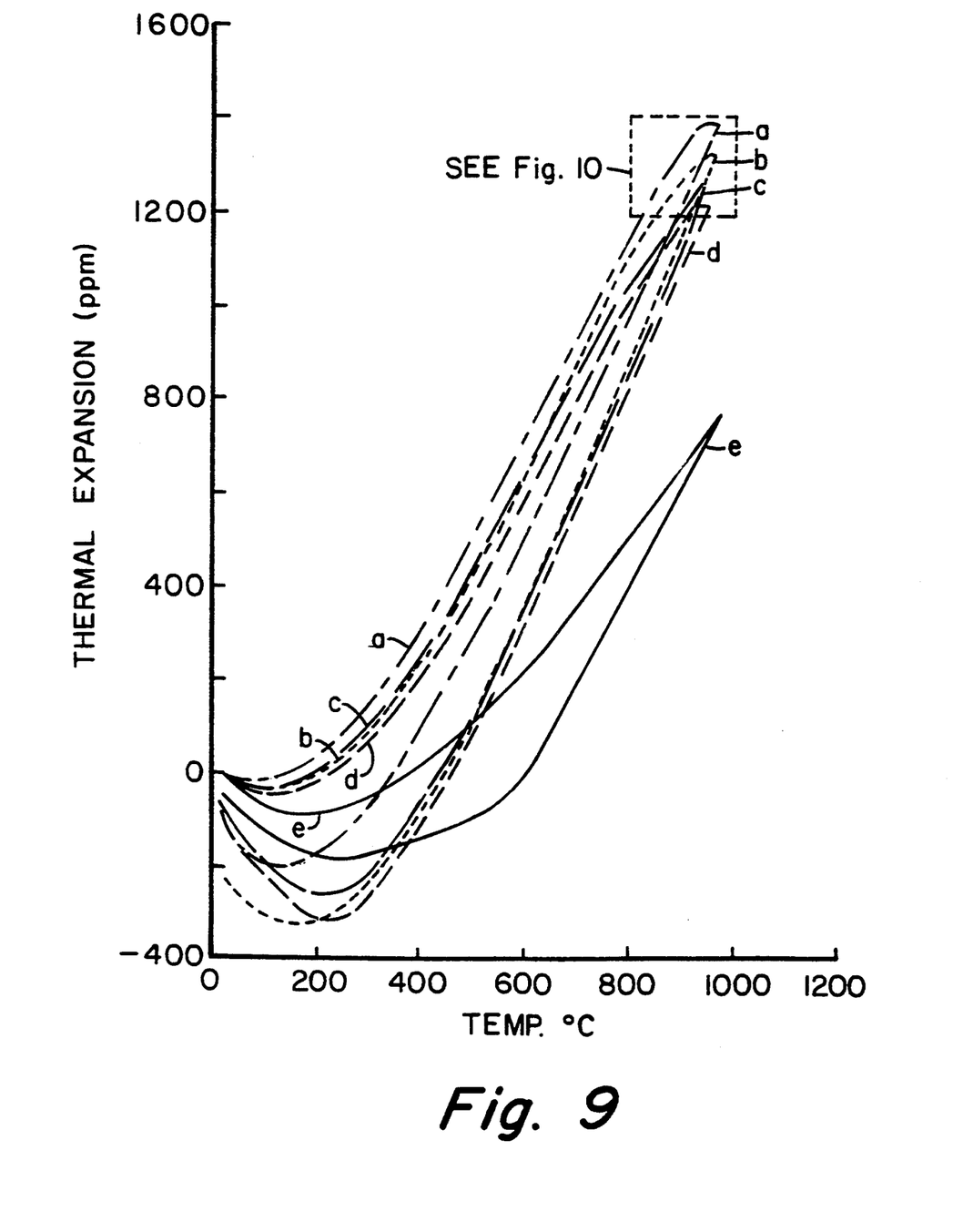
FIGS. 9 and 10 are graphs of the comparative thermal expansions of four coated ceramic substrates and an uncoated ceramic substrate.
Figure 10:
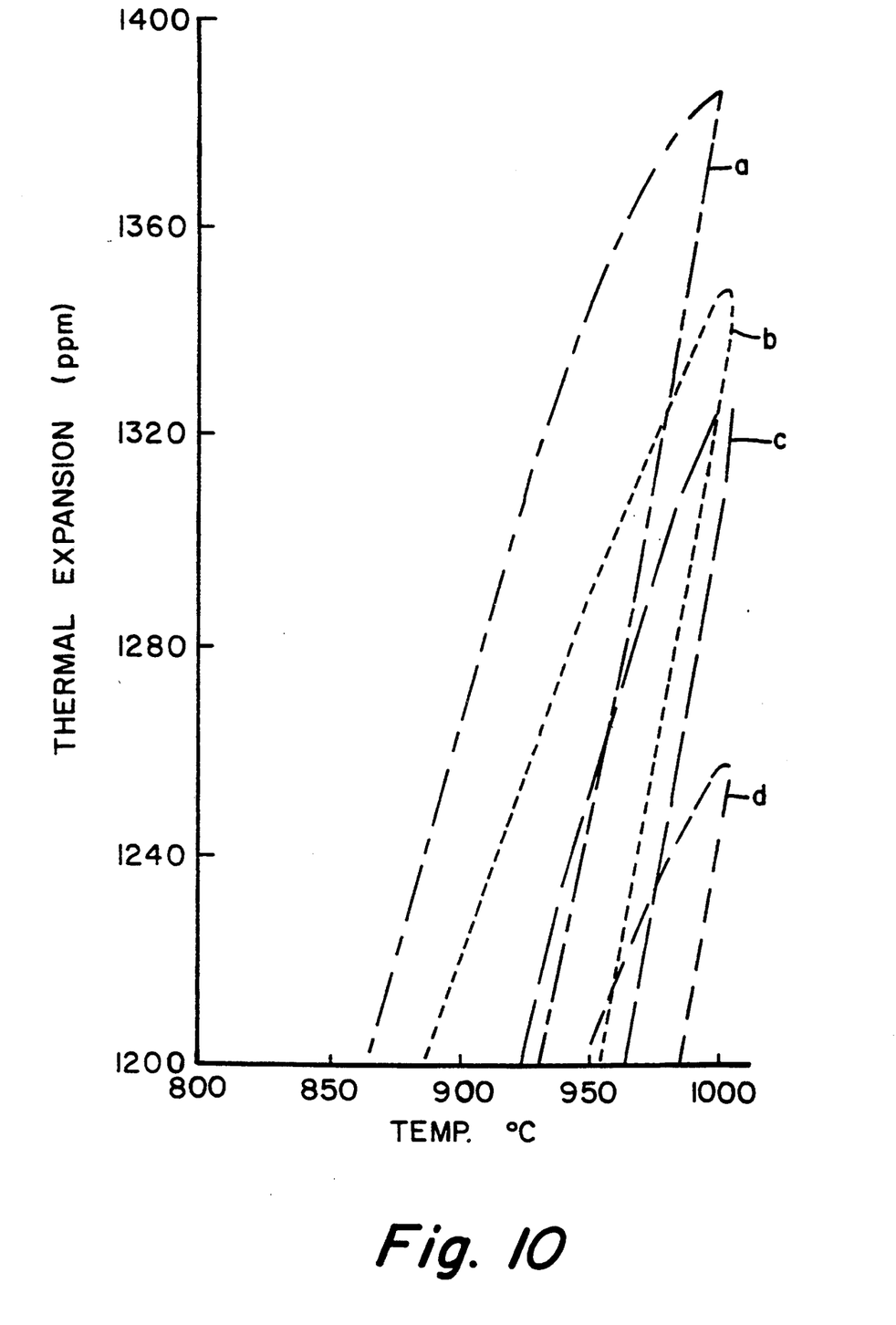

FIGS. 9 and 10 show the thermal expansion data for these three samples in comparison with uncoated EX-47 and conventionally coated EX-47. While all of samples 43-45 (curves c, d, and b, respectively) have lower expansions than the conventionally coated EX-47 (curve a) and have higher expansions than uncoated EX-47 (curve e), the more significant part of this data is the fact that the EX-47 honeycombs coated with either cerium acetate or the mixture of cerium acetate, alumina and ceria exhibit expansions much closer to the conventionally coated EX-47. This data illustrates the adverse effect of soluble inorganic constituents in the colloidal dispersion, which apparently more easily deposit, on heat treatment, particles of their corresponding oxide into the tips of microcracks to block the narrowing of them during thermal expansion of the EX-47 substrate, which is known to be a microcracked ceramic. As noted before, this adverse effect leads to thermal cracking. Thus, when applying this invention to washcoating of microcracked ceramic, it is beneficial to exclude soluble inorganic constituents from the washcoat colloidal dispersion.

Other colloidal dispersions that can be used in this invention are those of lanthania, yttria, and silica available from Nyacol Products Inc.

Besides using commercially available colloidal dispersions appropriate for this invention, existing washcoat materials that contain substantial amounts of colloidal particles can be milled to obtain the necessary smaller sized particles for entry into the pores.

The composition of the porous Fe-Al honeycombs mentioned herein is 23% Al and the balance Fe with less than 1% Mg plus incidental impurities.

We claim:

1. A catalyst device comprising a porous catalyst support, the support consisting essentially of: a multichannel substrate having porous walls defining the channels and a network of open pores distributed through the walls, the walls containing washcoat particles bonded to the walls, all of which particles are of colloidal particle sizes in the range of about 0.001-0.2 micrometers and selected from the group consisting of alumina, rare earth oxide, silica, and zirconia, over 50% of the washcoat particles being deposited within the pores on the surfaces thereof substantially throughout the walls, any other portion of the washcoat particles being deposited on the external surfaces of the walls, and the washcoat particles not filling any microcracks in the walls.

2. The device of claim 1 wherein the substrate consists essentially of material selected from ceramic material and metal material.

3. The device of claim 2 wherein the substrate consists essentially of ceramic material containing microcracks.

4. The device of claim 1 wherein metal catalyst is dispersed on and bonded to the washcoat particles.

5. The device of claim 4 wherein the metal catalyst is noble metal.

6. The device of claim 5 wherein the noble metal is metal selected from the platinum metal group.

7. The device of claim 6 wherein the metal is selected from platinum, palladium, and rhodium.

8. The device of claim 4 wherein a first metal catalyst is dispersed on and bonded to first washcoat particles, and a second, different metal catalyst is dispersed on and bonded to second, different washcoat particles.

9. The device of claim 8 wherein the first metal catalyst is selected from platinum and palladium, the first washcoat particles are alumina, the second metal catalyst is rhodium, and the second washcoat particles are ceria.

10. The device of claim 1 wherein the substrate consists essentially of a honeycomb structure.

11. The device of claim 1 wherein the colloidal particles have a particle size in the approximate range of 0.001 to 0.1 micrometer.

12. The device of claim 1 wherein the colloidal particles have a particle size in the approximate range of 0.001 to 0.05 micrometer.

13. The device of claim 1 wherein the particles are selected from particles of alumina, particles of alumina and ceria, and particles of zirconia.

14. The device of claim 1 wherein the substrate is an extruded monolith.

15. The device of claim 1 wherein the average diameter of the colloidal particles is in an approximate range of 1 to 100 nanometers.

16. A method of washcoating a multichannel substrate having porous walls defining the channels and a network of open pores distributed through the walls, which consists essentially of the steps of:

(a) obtaining a flowable colloidal dispersion of oxide particles in a first evaporable liquid, the particles being wholly of colloidal particles sizes in the range of about 0.001-0.2 micrometers and selected from the group of consisting of alumina, rare earth oxide silica and zirconia;

(b) contacting the walls of the substrate with the colloidal dispersion to cause the colloidal dispersion to infiltrate substantially all of the open pores;

(c) removing the walls of the substrate, with colloidal dispersion contained thereon, from contact with substantially the remainder of the colloidal dispersion to provide within the pores on the surfaces thereof a quantity of the contained colloidal dispersion having over 50% of the particles in the contained colloidal dispersion, and two provide on the external surfaces of the walls any other portion of the contained colloidal dispersion having any minor portion of the particles in the contained colloidal dispersion; and (d) drying the infiltrated substrate to cause the first liquid to evaporate out of the substrate, to cause the over 50% of the particles to deposit on the surfaces of the pores, and to cause the any other minor portion of the particles to deposit on the external surfaces of the walls.

17. The method of claim 16 further consisting essentially of:
   e) heat treating the dried substrate to bond the particles to the walls;

18. The method of claim 17 further consisting essentially of:
   f) contacting the bonded particles with a solution comprising a metal catalyst precursor in a second evaporable liquid to cause the precursor to adsorb and disperse on the bonded particles, and
   g) heating the substrate with adsorbed precursor to evaporate the second liquid out of the substrate, and to convert the precursor to the metal catalyst bonded and dispersed on the bonded particles.

19. The method of claim 18 wherein the metal catalyst is noble metal.

20. The method of claim 19 wherein the noble metal is metal selected from the platinum metal group.

21. The method of claim 20 wherein the metal is selected from platinum, palladium, and rhodium.

22. The method of claim 17 wherein the preparing step (a) consists essentially of incorporating a soluble catalyst metal precursor in the colloidal dispersion to cause the precursor to adsorb and disperse on the particles, and the heat treating step (e) consists essentially of heating to convert the precursor to the metal catalyst bonded and dispersed on the bonded particles.

23. The method of claim 22 wherein the metal catalyst is noble metal.

24. The method of claim 23 wherein the noble metal is metal selected from the platinum metal group.

25. The method of claim 24 wherein the metal is selected from platinum, palladium, and rhodium.

26. The method of claim 22 wherein the preparing step (a) consists essentially of:
   (i) obtaining a first flowable colloidal dispersion of first oxide particles in a first evaporable liquid,
   (ii) incorporating a first soluble precursor of a first catalyst metal in the first colloidal dispersion,
   (iii) obtaining a second flowable colloidal dispersion of second oxide particles in a second evaporable liquid,
   (iv) incorporating a second soluble catalyst metal precursor in the second colloidal dispersion, and
   (v) mixing the first and second colloidal dispersions from steps (ii) and (iv).

27. The method of claim 26 wherein the first oxide is alumina, the first catalyst metal is selected from platinum and palladium, the second oxide is ceria, and second catalyst metal is rhodium.

28. The method of claim 17 wherein the substrate consists essentially of material selected from ceramic material and metal material.

29. The method of claim 28 wherein the substrate consists essentially of ceramic material containing microcracks, and the colloidal dispersion is free of soluble inorganic constituent.

30. The method of claim 17 wherein the substrate consists essentially of a honeycomb structure.

31. The method of claim 17 wherein the colloidal particles have a particle size in the approximate range of 0.001 to 0.1 micrometer.

32. The method of claim 17 wherein the colloidal particles have a particle size in the approximate range of 0.001 to 0.05 micrometer.

33. The method of claim 17 wherein the particles are selected from particles of alumina, particles of alumina and ceria, and particles of zirconia.

34. The method of claim 17 wherein the substrate is an extruded monolith.

35. The method of claim 17 wherein the average diameter of the colloidal particles is in an approximate range of 1 to 100 nanometers.

* * * * *

UNITED STATES PATENT AND TRADEMARK OFFICE
CERTIFICATE OF CORRECTION

PATENT NO. : 5,334,570

DATED : August 2, 1994

INVENTOR(S) : P. A. Beauseigneur, I. M. Lachman, M. D. Patil, S. H. Swaroop, R. R. Wusirika It is certified that error appears in the above-indentified patent and that said Letters Patent is hereby corrected as shown below:

Title page [63], line 1, "1991" should be "1992"
In the Drawings:
Fig. 2 should be deleted and attached Fig. 2 should be inserted.

Col. 8, line 54, "Fe-al" should be "Fe-Al"

Col. 9, line 14, "fe-al" should be "Fe-Al"

Col. 10, line 13, "the" should begin a new paragraph

Col. 18, line 50, insert "," after "oxide"

Signed and Sealed this

Thirtieth Day of May, 1995

Attest:

BRUCE LEHMAN

Attesting Officer

Commissioner of Patents and Trademarks (PRIOR ART)
Fig. 1

(PRIOR ART)
Fig. 3

(PRIOR ART)
Fig. 2